No. 704,787. Patented July 15, 1902.
J. E. DUCHANOIS.
GANG SAW ATTACHMENT.
(Application filed Oct. 26, 1900.)
(No Model.)
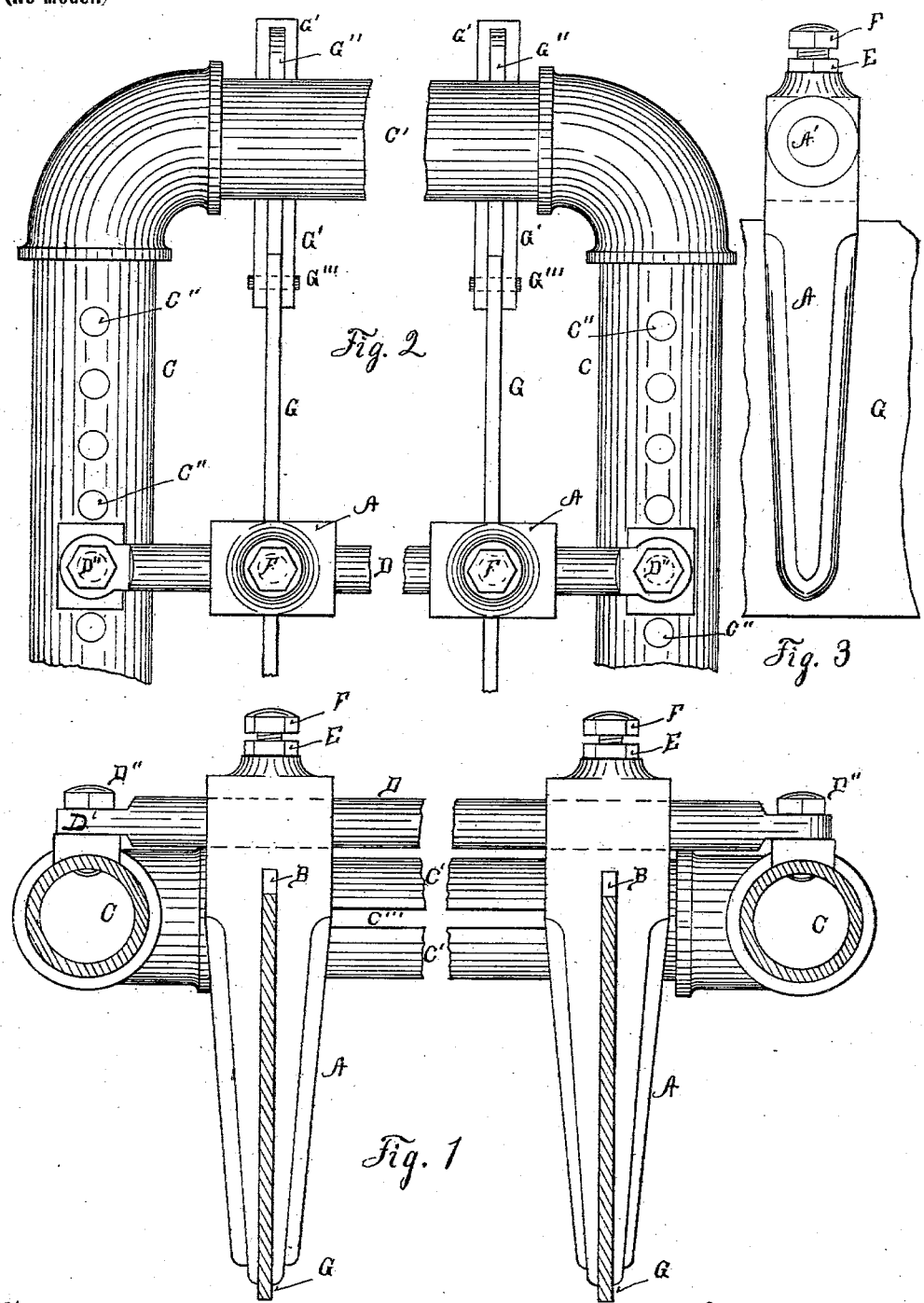

UNITED STATES PATENT OFFICE.

JOSEPH E. DUCHANOIS, OF COTTONWOOD FALLS, KANSAS.

GANG-SAW ATTACHMENT.

SPECIFICATION forming part of Letters Patent No. 704,787, dated July 15, 1902.

Application filed October 26, 1900. Serial No. 34,458. (No model.)

*To all whom it may concern:*

Be it known that I, JOSEPH E. DUCHANOIS, a citizen of the United States, residing at Cottonwood Falls, in the county of Chase and State of Kansas, have invented new and useful Improvements in Gang-Saw Attachments, of which the following is a specification.

My invention relates to gang-saw hangers wherein a secondary medium is used for holding the saws rigidly in their positions. There have been numerous such attachments devised. Four general objects are to be attained in such devices: first, adjustment to the length of the stone to be sawed; second, adjustment to the width of the stone to be sawed; third, security and simplicity in adjustment or operation, and, fourth, economy in construction. In all of the attachments heretofore devised one or more of these essentials have been disregarded. My device regards them all. The sand or grit and the water necessarily used in sawing stone will get into the parts of the machine, and thus render adjustment a very disagreeable, if not difficult, operation if the machine is adjustable at all.

The object of my invention is therefore to combine in a gang-saw an attachment which shall be adjustable to both the length and width of the stone to be sawed, which shall be secure and simple in adjustment and operation, and which shall be economical in construction.

In the illustrations, Figure 1 is an end elevation with the side bars of the gang-frame in section. Fig. 2 is a partial plan view giving parts of the gang-saw frame and showing the method of adjusting the bar D in its relation to the saws. Fig. 3 is a side view of the dog or clamp A, showing its position on one of the saws.

Similar letters refer to similar parts throughout the drawings.

The gang-saw frame is constructed of gas-pipe. The top of the side bars C has a series of threaded holes C" C" to receive the cap-screws D". The cross-bar D is round and has holes in its flattened ends of sufficient size to receive the body of said cap-screws, which hold said bar D firmly to said side bars C. The dogs or clamps A have round holes corresponding to said round bar D and may be strung on the bar D previous to its ends being flattened, or the bottoms of said round holes may be slotted out to receive said flattened ends. In the upper side of said dogs A (upper when they are in position clamped to the saws, as shown in the several views) are the set-screws F, which serve to hold the said dogs firmly in place on the bar D and which are in turn held in place by the jam-nut E. The dogs or clamps A are of one piece, of either cast-iron or cast-steel, and are slotted, as shown at B, to receive the saws G. By the use of the round bar D and the set-screw F being on the upper side of said dogs A it becomes an easy operation to remove said dogs from the saws G without raising the bar D from the gang-saw frame, for the dog may be simply turned or revolved on the round bar D until its length is in a horizontal plane and free from contact with the saw G, having first unscrewed the set-screw F. The advantage in having the set-screw on the upper side is that a wrench may be used upon it and turned entirely around. If it were on the side, as in some devices, the other saws and attachments will interfere with the movement of the wrench. The gang-saws G are attached to the end frame C' in the usual manner by means of the pin G''', the strap G', and the wedge G", the said strap G' passing, as shown, through the slot C'''' of the said frame C'.

In application the bar D, rigidly attached to the frame C of the saw-hanger at the points D' D' by the screws D" D", is placed in such position in relation to the gang-saws as may be necessary to the desired result, which is the holding of the saws rigidly in their several positions. For instance, a gang-saw set to saw a stone eight feet in length with a two-foot action of the gang in sawing could be practically rehung so as to saw a stone four feet in length with the same action in sawing by moving the bar D to a position bearing the same relation to the new length, or, in other words, by aid of the bar D, cap-screws D", and holes C", so far as practical results are concerned, the saw-hanger C may be shortened or lengthened, as may be desired.

In operation the number of the clamps A equal to the number of saws G placed in the gang-saw hanger C are strung upon the rod D.

As the saws are bound to either end of the gang-frame C, the clamps A, through the bar D, are set immediately over said stringing, being rigidly attached to the frame C by the devices shown at D' D' D" D", so that said clamps A may be forced down over the saws and fixedly held in their place by the set-screw F of the said clamp, said set-screw being rigidly set, the jam-nut E also being set, holding the set-screw F firmly in place, keeping it from jarring loose.

Another object in these adjuncts and binders is that a series of saws in the gang-saw hanger may be set to the required widths to be sawed, a simple measurement between the faces of the clamps A being all that is necessary to practically gage the widths to be sawed. With these devices measurements may be taken and the saws rigidly held in position in sawing by the clamping devices A, which are held in position at the required widths by the set-screws F and jam-nut E on the bar D.

What I claim as new, and desire to secure by Letters Patent, is—

In an attachment for a gang-saw frame the combination with the frame, a series of threaded holes in the upper sides of the side bars as shown, the cap-screws D", D"; the round cross-bar D adjustably attached to said frame C by said cap-screws D", D", and said threaded holes C", C"; a series of dogs or clamps A, A, each being of a single piece of cast iron or steel, and having round holes to fit onto said round bar D, and slots to receive the saws, and having in their upper ends the set-screws F, F, which are held in place by the jam-nuts E; and a series of saws G, G; substantially as described.

In testimony whereof I have affixed my signature in presence of two witnesses.

JOSEPH E. DUCHANOIS.

Witnesses:
E. B. JOHNSTON,
D. F. SHIRK.